United States Patent [19]

Davis

[11] Patent Number: 4,638,107
[45] Date of Patent: Jan. 20, 1987

[54] HEAT SENSITIVE TAPE AND METHOD OF MAKING SAME

[75] Inventor: Bayard C. Davis, Lombard, Ill.

[73] Assignee: XCO International, Inc., Elgin, Ill.

[21] Appl. No.: 738,521

[22] Filed: May 23, 1985

Related U.S. Application Data

[63] Continuation of Ser. No. 542,007, Oct. 14, 1983, abandoned, which is a continuation-in-part of Ser. No. 352,978, Feb. 26, 1982, abandoned.

[51] Int. Cl.$^4$ .............................................. H01L 35/08
[52] U.S. Cl. ...................................... 136/237; 136/233
[58] Field of Search ................ 136/138, 225, 228–233, 136/237; 339/89, 94; 338/20, 22, 25, 26, 28, 30, 208, 214, 238–232, 322, 332; 29/573, 611, 612, 613, 624; 374/111, 183, 107; 313/310; 219/540, 541, 544, 552; 73/341; 174/34; 340/228, 577

[56] References Cited

U.S. PATENT DOCUMENTS

| | | | |
|---|---|---|---|
| 1,279,252 | 9/1918 | Capp . | |
| 2,081,894 | 5/1937 | Meyer et al. | 201/76 |
| 2,271,975 | 2/1942 | Hall | 201/76 |
| 2,413,125 | 12/1946 | Walbridge | 201/63 |
| 2,470,653 | 5/1949 | Schulman et al. | 201/63 |
| 2,477,348 | 7/1949 | Postal | 201/63 |
| 2,495,867 | 1/1950 | Peters | 18/47.5 |
| 2,511,216 | 6/1950 | Miller | 25/157 |
| 2,586,252 | 2/1952 | Peters | 201/63 |
| 2,619,573 | 11/1952 | Dawson | 201/63 |
| 2,631,116 | 3/1953 | Fox | 136/138 |
| 2,639,247 | 5/1953 | Squier | 154/2.28 |
| 2,664,486 | 12/1953 | Colpitts | 201/63 |
| 2,665,322 | 1/1954 | MacDonald | 136/4 |
| 2,717,945 | 9/1955 | Dresios et al. | 338/26 |
| 2,728,833 | 12/1955 | Dickey | 201/63 |
| 2,740,874 | 4/1956 | Kelly et al. | 338/26 |
| 2,764,659 | 9/1956 | Postal | 201/63 |
| 2,805,272 | 9/1957 | Postal | 136/4 |
| 2,813,425 | 11/1957 | Woolley | 73/341 |
| 2,842,648 | 7/1958 | Reynolds | 338/26 |
| 2,848,587 | 8/1958 | Postal | 201/63 |
| 2,868,935 | 1/1959 | Howatt | 201/63 |
| 2,936,434 | 5/1960 | Postal | 338/26 |
| 2,941,192 | 6/1960 | Postal | 340/228 |
| 3,045,326 | 7/1962 | Griffiths | 29/155.5 |
| 3,069,752 | 12/1962 | Sherning | 29/155.5 |
| 3,089,339 | 5/1963 | Rogers et al. | 73/362 |

List Continued on next page.

OTHER PUBLICATIONS

Bulletin TT-318, Insulated Thermocouple and Extension Wire, Trinity Equip. Corp., Cortland, N.Y., 6 pages.

Brochure of Alison Control Inc., "Alison Control Has the Answer", (8 pages), undated.

Articles by Charles Doak of Alison Control Inc., "Integrated Fire Protection for the Modern Generating Station", (4 pages), Instrumentation & Control, undated.

List Continued on next page.

Primary Examiner—John F. Terapane
Assistant Examiner—T. J. Wallen
Attorney, Agent, or Firm—Wood, Dalton, Phillips, Mason & Rowe

[57] ABSTRACT

A heat sensitive tape capable of generating a temperature representative measurable voltage. The tape includes an elongated flexible strip of electrically nonconductive material. A pair of thermoelectric conductors extend along the strip in spaced apart side-by-side relation. The tape also includes an electrical insulation capable of passively self-generating a temperature representative voltage between the conductors when the tape is exposed to ambient temperature. The insulation causes a change in the temperature representative measurable voltage with an increase or decrease in temperature at every location along the strip. A change in the temperature representative measurable voltage under such condition is representative of a change in ambient temperature. The insulation also causes a change in the temperature representative measurable voltage with an increase in temperature above the prevailing ambient at any location along the strip. With this arrangement, the heat sensitive tape may be utilized not only to monitor ambient temperature, but also to monitor for any localized increase in temperature.

31 Claims, 10 Drawing Figures

U.S. PATENT DOCUMENTS

| | | | |
|---|---|---|---|
| 3,205,296 | 9/1965 | Davis et al. | 174/34 |
| 3,266,001 | 8/1966 | Landis et al. | 338/22 |
| 3,267,733 | 8/1966 | Chambers | 73/362 |
| 3,295,087 | 12/1966 | Landis et al. | 338/28 |
| 3,315,214 | 4/1967 | Davis | 339/94 |
| 3,329,534 | 7/1967 | Adler et al. | 136/233 |
| 3,353,260 | 11/1967 | Davis et al. | 29/573 |
| 3,366,913 | 1/1968 | Davis et al. | 338/322 |
| 3,376,169 | 4/1968 | Davis et al. | 136/230 |
| 3,400,356 | 9/1968 | Davis et al. | 338/208 |
| 3,408,607 | 10/1968 | Davis | 338/26 |
| 3,434,207 | 3/1969 | Frachon | 29/612 |
| 3,441,893 | 4/1969 | Gordon et al. | 338/26 |
| 3,444,740 | 5/1969 | Davis | 73/359 |
| 3,451,861 | 6/1969 | Gordon et al. | 136/230 |
| 3,492,170 | 1/1970 | Davis et al. | 136/233 |
| 3,493,949 | 2/1970 | Servos et al. | 340/228 |
| 3,513,432 | 5/1970 | Davis | 338/28 |
| 3,530,423 | 9/1970 | Davis | 339/89 |
| 3,537,053 | 10/1970 | Snoberger et al. | 338/26 X |
| 3,538,596 | 11/1970 | Davis et al. | 29/573 |
| 3,607,447 | 9/1971 | Davis | 136/233 |
| 3,622,901 | 11/1971 | Ledran et al. | 338/35 |
| 3,660,158 | 5/1972 | Chen et al. | 117/217 |
| 3,683,696 | 8/1972 | Vaughan et al. | 73/344 |
| 3,729,343 | 4/1973 | Thomas | 136/225 |
| 3,737,997 | 6/1973 | Davis | 29/624 |
| 3,816,182 | 6/1974 | McAdam | 136/230 |
| 3,831,269 | 8/1974 | Sommer | 29/612 |
| 3,925,104 | 12/1975 | Thomas | 136/225 |
| 4,075,036 | 2/1978 | Lysikov et al. | 136/233 |
| 4,094,061 | 6/1978 | Gupta et al. | 29/612 |
| 4,175,437 | 11/1979 | Burt | 73/362 |
| 4,324,138 | 4/1982 | Davis | 73/341 |
| 4,491,822 | 1/1985 | Davis | 136/233 |

OTHER PUBLICATIONS

Specification of Alison Control Inc., "9090 Series Continuous Thermister Sensors" (3 pages), 3/6/75 and 9/20/77.

Technical Report of Alison Control Inc., "Technical Report No. 9, 9090 Series Continuous Thermistor Sensor in Nuclear Environments" (6 pages), 11/16/70.

Technical Report of Alison Control Inc., "Technical Report No. 10, Intrinsicially Safe Fire Detection Systems" (6 pages), 11/25/70.

Brochure of Fastener Engineers, Inc., "fe Fastener Engineers In-Line Wire Drawing Machines with Mechanical Variable Speed Drives" (8 pages), undated.

Brochure of Fastener Engineers, Inc., "fe Fastener Engineers In-Line Wire Drawing Machines with Hydraulic Variable Speed Drives" (4 pages), 5/77.

Brochure of Kidde Belleville Division of Walter Kidde & Company, Inc., "The Cold Facts . . . About Cryogenic Temperature Detection" (2 pages), 11/79.

Literature of Kidde Belleville Division of Walter Kidde & Company, Inc., "Kidde Continuous Strip Fire Detector" (4 pages), 3/79.

Brochure of Kidde Belleville Division of Walter Kidde & Company, Inc., "Superior Protection for Modern Industry with Kidde Fire and Overheat Continuous Detection Systems" (4 pages), approximately 1/07/80.

Brochure of Kidde Belleville Division of Walter Kidde & Company, Inc., "Karos-A Contemporary Computer-Managed Fire and Security System from Kidde Belleville" (8 pages), undated.

Literature of Walter Kidde & Company, Inc., "K Kidde Discrete Temperature Monitoring Systems" (2 pages), 2/77.

Data Sheets of Walter Kidde & Company, Inc., "Sensing Element Continuous Fire Detector", Data Sheets 1422-25 (2 pages), 1422-10 (2 pages), 1422-25 (2 pages), 1422-30 (2 pages), 1422-67 (2 pages), 1422-77 (2 pages), 1422-87 (2 pages), and 1422-97 (2 pages), undated.

Article by R. C. Rittenhouse, "Fire: Detection and Prevention at Power Plants", Power Engineering, vol. eighty-five, No. 2, (pp. 42 through 50), Feb., 1981.

Catalog of The Protectowire Co., "Protectorwire Heat Detection in Cable Trays and Associated Facilities" (13 pages) (undated).

Bulletin TT-318, Insulated Thermocouple and Extension Wires, Trinity Equip. Corp. (6 pages), undated.

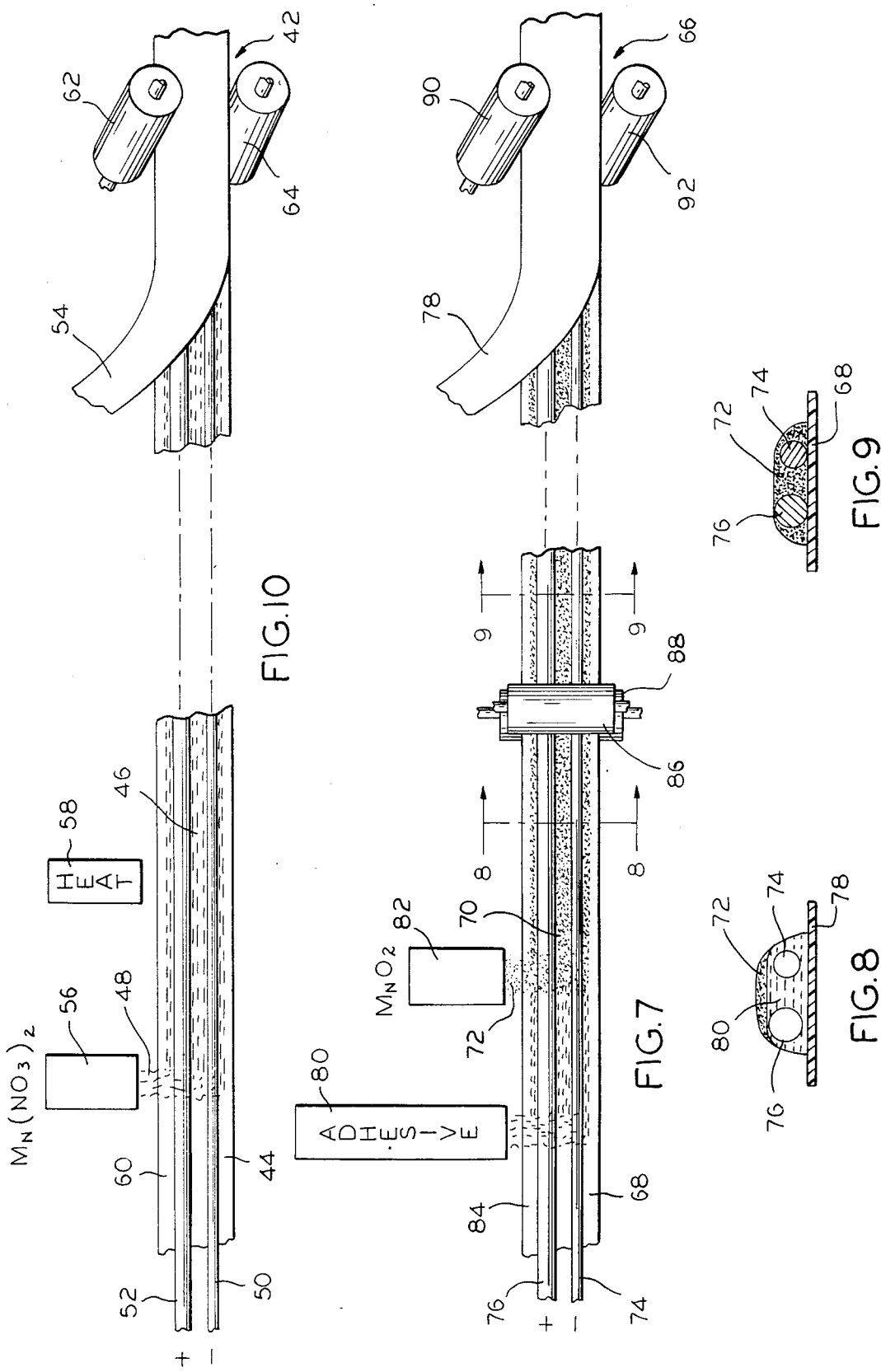

HEAT SENSITIVE TAPE AND METHOD OF MAKING SAME

RELATED APPLICATIONS

The present application is a continuation of my earlier copending application Ser. No. 542,007, filed Oct. 14, 1983, now abandoned, which is a continuation-in-part of Ser. No. 352,978, filed Feb. 26, 1982, now abandoned.

BACKGROUND OF THE INVENTION

The present invention relates to heat sensitive devices and, more particularly, to a heat sensitive tape and method of making same.

Heat sensitive devices which are characterized by the use of semiconductive materials having inverse temperature-resistance characteristics in conjunction with dissimilar thermoelectric conductors are now well known in the art. Such devices are particularly suitable where it is desired to monitor the greatest temperature existing along the length of a cable, for example, and are exemplified in connection with a system for measuring and locating temperature conditions of interest in U.S. Pat. Nos. 3,408,607 and 4,324,138. Thermistor cables which are characterized by a core of semiconductive material surrounded by a mass of temperature-resistant electrically-insulating material covered with a protective metallic sheath are also well known in the art.

Despite the clear advantages and many applications for such devices, they have simply not evolved to the point of providing the desired degree of versatility. It has remained to develop a heat sensitive tape capable of generating a measurable and predictable voltage when the entire length of the tape is at ambient, e.g., 72° F., wherein the tape is also adapted to provide a change in the temperature representative measurable voltage with an increase in temperature above the prevailing ambient temperature at any location along the tape. If this could be achieved with an electrical insulation having a negative temperature coefficient, the thermoelectric output of the tape or a section thereof would be altered in a predictable fashion.

Moreover, if this could be achieved, the tape location where an increase in temperature takes place could be located electronically. This could be done, for instance, as fully disclosed and claimed in my earlier U.S. Pat. No. 4,324,138, issued Apr. 13, 1982, for a method of and apparatus and system for determining temperature conditions. As set forth therein, the applications are virtually limitless.

While the value of heat sensitive devices has long been recognized, it has remained to provide a heat sensitive tape having the requisite versatility for the many applications to be benefited by use thereof. In fact, despite my many prior inventions in this field, as exemplified by U.S. Pat. Nos. 3,408,607 and 3,513,432, the missing link to providing a highly versatile heat sensitive tape, in addition to the heat sensitive cables I have previously developed, has remained. Despite the advantages that will be recognized by those skilled in the art, heat sensitive tape which may not only be utilized to monitor ambient temperature but also may be utilized to monitor for any localized increase above ambient temperature has simply not been available.

It is therefore an object of the present invention to provide a heat sensitive tape having means for generating a temperature representative measurable voltage.

It is also an object of the present invention to provide a tape of the type described utilizing an elongated flexible strip of electrically non-conductive material.

It is a further object of the present invention to provide a tape of the type described which comprises a temperature monitoring device having a pair of thermoelectric conductors disposed in spaced apart relation to extend along the strip of electrically non-conductive material in contact with means for passively self-generating a temperature representative measurable voltage between the conductors when the tape is exposed to ambient temperature.

It is another object of the present invention to provide a tape of the type described which is not only passive and self-generating to generate a voltage potential between the thermoelectric conductors indicative of the temperature existing along the entire length of the tape, i.e., the ambient temperature, but which also generates a voltage potential between the thermoelectric conductors indicative of the hottest point along the length of the tape if the temperatures are unequal.

It is still another object of the present invention to provide a tape of the type described in which the passive self-generating characteristic causes a change in the temperature representative measurable voltage with an increase or decrease in temperature at every location along the strip.

It is still another object of the present invention to provide a tape of the type described wherein the passive self-generating characteristic causes a change in the temperature representative measurable voltage with an increase in temperature above the prevailing ambient at any location along the strip.

It is still another object of the present invention to provide a tape of the type described capable of precise, non-perishable, reproducible measurement of the temperature and identification of the location of the hottest spot when monitoring with a high input impedance temperature device.

It is still another object of the present invention to provide a tape of the type described wherein the elongated flexible strip, the electrical insulation, and the thermoelectric conductors can be formed of various materials and combinations of materials to yield various mechanical properties and temperature-voltage response curves.

It is a further object of the present invention to provide a tape of the type described which can be produced in lengths of thousands of feet at a low cost to facilitate utilization in a wide variety of applications including the home.

An additional object of the present invention is to provide a tape of the type described utilizing commercially available materials and processes to manufacture the tape.

These and other objects, advantages and features of the present invention will be apparent from a consideration of the accompanying specification, claims and drawings.

SUMMARY OF THE INVENTION

Accordingly, the present invention is directed to a heat sensitive tape capable of generating a temperature representative measurable voltage. The tape includes an elongated flexible strip of electrically non-conductive material. A pair of thermoelectric conductors extending along the strip in spaced apart side-by-side relation are also provided. The tape also includes means for passively self-generating a temperature representative measurable voltage between the conductors when the tape is exposed to ambient temperature. The passive self-generating means includes means for causing a change in the temperature representative measurable voltage with an increase or decrease in temperature at every location along the strip. A change in the temperature representative measurable voltage under such condition is representative of a change in ambient temperature. The passive self-generating means also includes means for causing a change in the temperature representative measurable voltage with an increase in temperature above the prevailing ambient at any location along the strip. With this arrangement, the heat sensitive tape may be utilized not only to monitor ambient temperature but also to monitor for any localized increase in temperature.

In a preferred embodiment, the passive self-generating means includes an electrical insulation having a negative temperature coefficient disposed on at least a portion of one surface of the strip. Preferably, the surface portion of the strip has an adhesive thereon and the surface portion is treated by impregnating the adhesive with manganese dioxide which has been heat treated to remove all moisture, or the surface portion is treated with manganese nitrate, in which case the electrical insulation will provide the required temperature representative measurable voltage throughout the desired range of temperature. Moreover, the thermoelectric conductors suitably formed of thermoelectrically dissimilar materials are then positioned on the strip in contact with the electrical insulation.

In the exemplary embodiment, a second elongated flexible strip of electrically non-conductive material is provided to overlie the conductors and insulation. The second flexible strip is advantageously adhesively secured to the first flexible strip to retain the conductors in spaced apart side-by-side relation in contact with the insulation. Moreover, at least one of the flexible strips advantageously has an adhesive on an outwardly facing surface to permit the tape to be adhesively secured to another surface to monitor temperature.

With respect to the method of manufacturing the tape, an elongated flexible strip of electrically non-conductive material is initially provided together with means for passively self-generating a temperature representative measurable voltage between a pair of conductors. Next, a pair of thermoelectric conductors are selected for positioning on the strip in spaced apart side-by-side relation. The passive self-generating means is selected so as to include means for causing a change in the temperature representative measurable voltage with an increase or decrease in temperature at every location along the strip, i.e., with a change in the ambient temperature, and the voltage also changes with an increase in temperature above the prevailing ambient at any location along the strip. Next, the conductors are secured to extend along the strip in contact with the passive self-generating means in spaced apart side-by-side relation. With this method, a heat sensitive tape is provided which may be utilized not only to monitor ambient temperature but also to monitor for any localized increase in temperature.

BRIEF DESCRIPTION OF THE DRAWINGS

In the drawings:

FIG. 7 is a diagramatic view of another method of manufacturing tape in accordance with the present invention;

FIG. 8 is a cross sectional view taken on the line 8—8 of FIG. 7;

FIG. 9 is a cross sectional view taken on the line 9—9 of FIG. 7; and

FIG. 10 is a diagramatic view of still another method of manufacturing tape in accordance with the present invention.

DETAILED DESCRIPTION OF THE PREFERRED EMBODIMENTS

Figure 1:
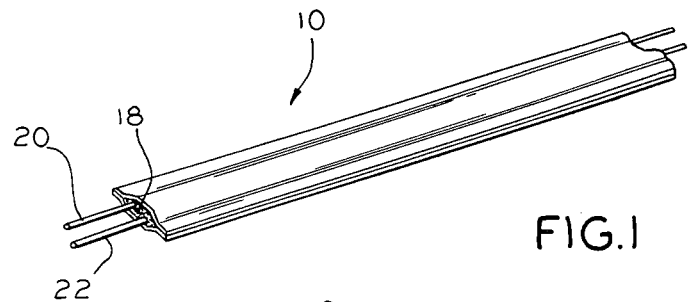
FIG. 1 is a perspective view of a section of heat sensitive tape in accordance with the present invention.
Figure 2:
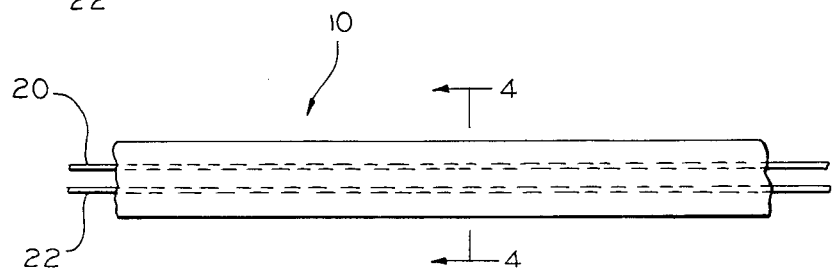
FIG. 2 is a plan view of the heat sensitive tape illustrated in FIG. 1.
Figure 3:
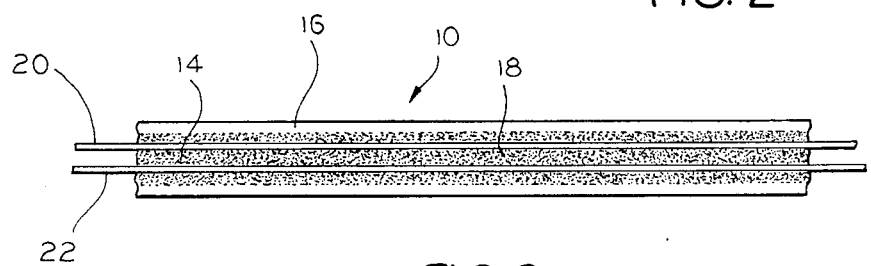
FIG. 3 is a plan view, similar to FIG. 2, but with the top flexible strip removed.

Referring to the drawings, and first to FIG. 1, the reference numeral 10 designates generally heat sensitive tape capable of generating a temperature representative measurable voltage. The tape 10 includes an elongated flexible strip 12 of electrically non-conductive material. A pair of thermoelectric conductors 20 and 22 extending along the strip 12 in spaced apart side-by-side relation are also provided. The tape 10 also includes means for passively self-generating a temperature representative measurable voltage between the conductors 20 and 22 when the tape 10 is exposed to ambient temperature. The passive self-generating means, which will be described in detail hereinafter, includes means for causing a change in the temperature representative measurable voltage with an increase or decrease in temperature at every location along the strip 12. A change in the temperature is representative of a change in ambient temperature. The passive self-generating means also includes means for causing a change in the temperature representative measurable voltage with an increase in temperature above the prevailing ambient at any location along the strip 12. With this arrangement, the heat sensitive tape 10 may be utilized not only to monitor ambient temperature but also to monitor for any localized increase in temperature.

In a preferred embodiment, the passive self-generating means includes an electrical insulation 18 having a negative temperature coefficient disposed on at least a portion 14 of one surface 16 of the strip 12. Preferably, the surface portion 14 of the strip 12 is provided by applying a manganese nitrate solution or heat treated manganese dioxide. By so doing, the resulting electrical insulation 18 which is formed over and between the conductors 20 and 22 will provide the required temperature representative measurable voltage throughout the desired range of temperatures.

With regard to the electrical insulation 18, the surface portion 14 is provided in one embodiment by applying heat treated manganese dioxide powder following the teachings in my co-pending patent application Ser. No.

Figure 6:
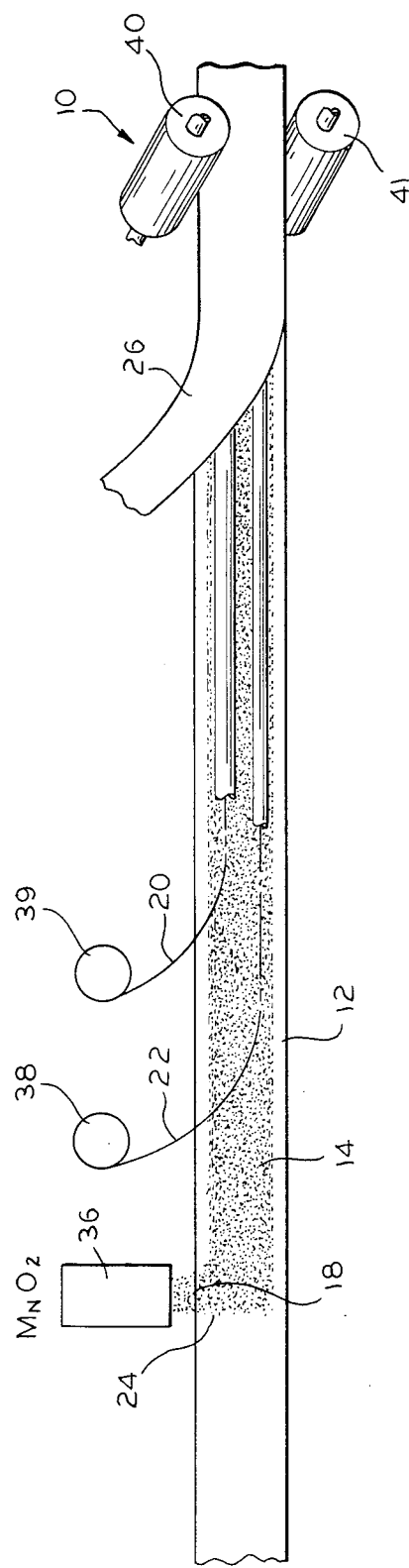
FIG. 6 is a diagramatic view of a method of manufacturing tape in accordance with the present invention.

317,631, filed Nov. 2, 1981 (see, also, FIG. 6). With this material, the insulation has an insulation resistance of between approximately 3,000 and 6,000 ohms at approximately 72° F. which has been found sufficient to produce a negative temperature coefficient insulator operable over a wide temperature range.

Figure 4:
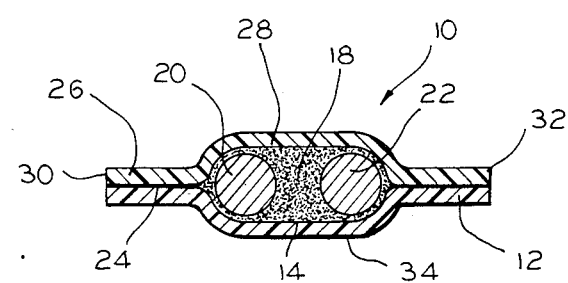
FIG. 4 is a sectional view taken on the line 4—4 of FIG. 2.

Referring now to FIG. 4, preferably at least the surface portion 14 of the strip 12 (and, if desired, an entire surface of the strip) is covered with a very thin layer of bonding material or adhesive 24 prior to being treated with the insulation 18. The surface portion 14 of the strip 12 may then be provided by depositing the electrical insulation 18 on the thin layer of bonding material or adhesive 24, at least along the center portion of the strip 12, where the electrical insulation 18 is preferably the previously discussed heat treated manganese dioxide which has been heated prior to application to remove all moisture, e.g., heated at a temperature of around 400° F. for a period of 24 to 36 hours. By utilizing the thin layer of bonding material or adhesive 24, the conductors 20 and 22 may be adhesively secured to the strip 12 in spaced apart side-by-side relation, and at least a portion of the electrical insulation 18 may then be adhesively secured to the strip 12 in contact with both of the conductors 20 and 22.

In the embodiment illustrated in FIGS. 1 through 6, the thermoelectric conductors 20 and 22 disposed on the surface portion 14 of the strip 12 are suitably formed of thermoelectrically dissimilar materials. One of the conductors 20 may, for instance, advantageously be formed of a nickel/chromium alloy and the other of the conductors 22 may advantageously be formed of a copper/nickel alloy, although it will be appreciated that all of the embodiments illustrated in the drawings need only be formed of thermoelectrically dissimilar materials, e.g., those commonly known as ANSI K, E, J, or T thermoelectric pairs, or any other conductors formed of thermoelectrically dissimilar materials. Nevertheless, when nickel/chromium and copper/nickel alloys are selected, it has been found advantageous for the nickel/chromium alloy to comprise approximately 90 percent nickel and 10 percent chromium and the copper/nickel alloy to comprise approximately 55 percent copper and 45 percent nickel.

Still referring to FIGS. 1 through 6, a second elongated flexible strip 26 of electrically non-conductive material is preferably provided to overlie the conductors 20 and 22 and insulation 18 and is advantageously secured to the first flexible strip 12 to aid in retaining the conductors 20 and 22 in spaced apart side-by-side relation in contact with the insulation 18. Moreover, the second flexible strip 26 may have a very thin layer of bonding material or adhesive 28 on at least the surface confronting the first flexible strip 12 so that the second flexible strip 26 may be adhesively secured along the marginal edge portions 30 and 32 to the first flexible strip 12.

As will be appreciated, the thin layer of bonding material or adhesive 28 may also aid in securing the conductors 20 and 22 in spaced apart side-by-side relation. It will also be appreciated that the thin layer of bonding material or adhesive 28, in cooperation with the thin layer of bonding material or adhesive 24, not only secures the marginal edge portions 30 and 32 together to confine the conductors 20 and 22 and the insulation 18 in position between the two flexible strips 12 and 26, but also adhesively contacts the insulation 18 to retain the conductors 20 and 22 in contact with the insulation 18. Moreover, in addition to the thin layers of bonding material or adhesive 24 and 28, at least one of the flexible strips 12 may advantageously have a thin layer of bonding material or adhesive 34 on the surface facing away from the other of the strips 26, whereby the heat sensitive tape 10 may be adhesively secured to a surface to monitor temperatures.

With respect to the method of manufacturing the tape, an elongated flexible strip of electrically non-conductive material is initially provided together with means for passively self-generating a temperature representative measurable voltage between a pair of conductors. Next, a pair of thermoelectric conductors are selected for positioning on the strip in spaced apart side-by-side relation. The passive self-generating means is selected so as to include means for causing a change in the temperature representative measurable voltage with an increase or decrease in temperature at every location along the strip, i.e., with a change in the ambient temperature, and the voltage also changes with an increase in temperature above the prevailing ambient at any location along the strip. Next, the conductors are positioned so as to extend along the strip in contact with the passive self-generating means in spaced apart side-by-side relation With this method, a heat sensitive tape is provided which may be utilized not only to monitor ambient temperature but also to monitor for any localized increase in temperature.

As previously mentioned, the passive self-generating means preferably includes an electrical insulation disposed on at least a portion of one surface of the strip. The method may advantageously include the step of covering the surface portion of the strip with a very thin layer of bonding material or adhesive to be impregnated with heat treated manganese dioxide. It is also contemplated, as before, that the pair of thermoelectric conductors be selected so as to be formed of thermoelectrically dissimilar materials such as and nickel/chromium alloy and copper/nickel alloy. Moreover, the method preferably includes the step of providing a second elongated flexible strip of electrically non-conductive material. It is then contemplated, as before, that the second flexible strip may be adhesively secured to the first flexible strip to retain the conductors in spaced apart side-by-side relation in contact with the insulation. The method may also advantageously include the step of providing at least one of the first and second flexible strips with an adhesive on the surface facing away from the other of the strips. With the method of the invention, a heat sensitive tape is provided which may be adhesively secured to a surface to monitor temperature.

Figure 5:
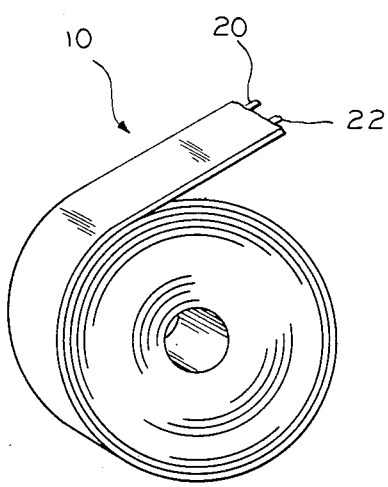
FIG. 5 is a perspective view of a roll of heat sensitive tape in accordance with the present invention.

Referring to FIG. 4, it will be appreciated that the components making up the heat sensitive tape 10 have been exaggerated in size and relationship for clarity of illustration. The tape 10 will actually be very thin and the presence of the conductors 20 and 22 and the insulation 18 between the two flexible strips 12 and 26 will cause only a very slight bulge or enlargement, as best suggested in FIG. 1. In fact, the enlargement will be sufficiently small that the heat sensitive tape 10 may be provided in a roll as shown in FIG. 5.

Referring now to FIGS. 7 through 9, an alternative embodiment of the present invention is illustrated. The heat sensitive tape 66 is preferably identical to the heat sensitive tape 10 with a single exception, i.e., the way in which the electrical insulation 72 is applied to the surface portion 70 of the strip 68. As shown, the electrical insulation 72 is comprised of a powder embedded in a bonding material or adhesive 80.

As illustrated, the conductors 74 and 76 are initially positioned so as to extend along the strip 68 in spaced apart relation on the surface 84. Next, a thick layer of bonding material or adhesive 80 is applied to the surface portion 70 to extend between and over the conductors 74 and 76 and the powdered electrical insulation 72 (which is preferably heat treated manganese dioxide) is applied over the bonding material or adhesive 80 as at 82. As will be seen, the powdered electrical insulation 72 is then embedded in the bonding material or adhesive 80 by means of rollers 86 and 88, respectively. Then, a second strip 78 is applied over the strip 68 to cover the electrical insulation 72 and conductors 74 and 76. With one or both of these strips having a bonding material or adhesive on the confronting surfaces, the heat sensitive tape 66 is completed by pressing the strips 68 and 78 together by means of rollers 90 and 92, respectively.

As for the bonding material or adhesive, any material capable of use within the desired temperature limits can be utilized. For instance, it is possible to use an adhesive such as Amicon CT-547-2, C840, or C950 sold by the Polymer Products Division of Amicon Corporation. However, many bonding materials or adhesives are acceptable for use in the heat sensitive tape of the invention.

Referring now to FIG. 10, another alternative embodiment of the present invention is illustration. The heat sensitive tape 42 is comprised of thermoelectrically dissimilar conductors 50 and 52, and electrical insulation 48 applied as at 56 on at least the portion 46 of the surface 60 of the strip 44. As shown, the electrical insulation 48 is preferably a solution of manganese nitrate.

As will be appreciated, the surface portion 46 of the strip 44 is provided by applying a manganese nitrate solution 48 over and between the conductors 50 and 52. The manganese nitrate solution is provided by heating manganese nitrate at a temperature of approximately 100° F. until melted and thereafter heating the melted manganese nitrate at between approximately 400° to 500° F. for approximately three minutes and the strip is preferably heated after (or just prior to) applying the manganese nitrate solution over and between the conductors 50 and 52. In practice, it has been found advantageous to provide a solution of approximately 61% manganese nitrate and the strip is heated to a temperature of between 300° and 400° F.

As shown, a second strip 54 is preferably applied over the strip 44. It will again be appreciated that one or both of the strips 44 and 54 may include a very thin layer of bonding material or adhesive, particularly on the outer edges thereof, for securing the strips together. As shown, the rollers 62 and 64 may be utilized to press the strips 44 and 54 into adhesively secured contact.

Referring to FIGS. 7 through 10, it will be observed that the positive conductors 52 and 76 are larger in diameter than the negative conductors 50 and 74, respectively. This is done to facilitate wiring the tape to suitable monitoring equipment by assuring that even untrained personnel will be able to visually identify the positive conductor and thereafter attach it to the positive terminal of the equipment and in like fashion identify the negative conductor and attach it to the negative terminal, particularly when it is considered that the positive and negative conductors will usually be the same color. When it is considered that the size of the conductors can be as small as approximately 0.012 inches, the advantage of providing a visibly larger diameter positive conductor will be apparent.

While the invention is not to be construed as limited to any specific components, one practical embodiment utilizes two pieces of Scotch brand Magic Transparent Tape #810 for the flexible strips 12 and 26. In this embodiment, the center portion of the adhesive side of one of the pieces of the #810 tape is impregnated with heat treated manganese dioxide completely along its axial length and the two conductors, one being 36 gauge Chromel brand wire of Hoskins Manufacturing Co., Detroit, Mich., and the other being 36 gauge Constantan brand wire available from the same company are affixed to the adhesive of the second piece of #810 tape, in spaced apart relationship along the axial length thereof. With this arrangement, the two #810 tapes are then securely affixed to one another with the Chromel and Alumel wires pressed into the heat treated manganese dioxide insulation utilizing the unused portion of the adhesive on each tape.

With the present invention, a heat sensitive tape has been provided which is capable of generating a measurable voltage when exposed to a temperature of, e.g., 72° F. The voltage measured is representative of that temperature (ambient) and the thermoelectric output of the tape or a section thereof when exposed to a higher temperature will generate a voltage representative of the higher temperature. Moreover, the heat sensitive tape is capable of generating a measurable and predictable voltage as the ambient to which the entire length is exposed is raised above or reduced below 72° F., e.g., a temperature between around −20° F. and 500° F. or higher depending upon the limitations of the materials being used. The voltage measured is representative of that temperature (a new ambient) and the thermoelectric output of the tape or a section thereof when exposed to a higher temperature would again generate a voltage representative of the higher temperature. Therefore, the heat sensitive tape may be utilized not only to monitor ambient temperature but also to monitor for any localized increase above ambient temperature, and the exact location along the tape where any localized increase occurs can be located electronically.

As previously mentioned, the tape includes a chemically treated surface portion, preferably treated with manganese hitrate solution or heat treated manganese dioxide, to provide a permanent insulation having a high negative temperature coefficient. The thermoelectric conductors when placed in spaced apart side-by-side relation along their entire axial length and held with a portion of their external surfaces in contact with the insulation over their entire axial length, as required for a specific application or measurement, will generate a voltage representative of the highest temperature along the length of the tape. Additionally, the thermoelectric condutors may be held apart by being affixed in the insulation to a single flexible strip or by being affixed to a separate flexible strip and then secured to the insulation-carrying first flexible strip, as desired.

As will be appreciated, the heat sensitive tape of the present invention will constantly generate a measurable voltage. This voltage is usable with conventional, inexpensive pyrometers, analog meters, digital readout indicators, strip chart recorders, temperature controllers and transmitters, state of the art microprocessor based data loggers, calculating data loggers, programmable controllers, etc. Further, with the use of conventional time domain reflectometers and electronic circuitry, the exact location along the tape where the maximum temperature exists may be located.

While all of the embodiments illustrated in the drawings utilize a pair of conductors, it will be appreciated that one or more additional conductors may also be provided. Such an additional conductor, whether insulated or non-insulated, may be useful, for instance, where a bridge network type of location device will be used. Accordingly, the present invention is to be construed as requiring a minimum of two thermoelectric conductors.

With the present invention, an inexpensive product has been provided which may be easily installed by inexperienced persons utilizing the same conventional means as used in modern home construction. The tape is also reusable (within the limits of the tape materials) and effectively provides a continuous temperature sensor. Finally, if desired, one or both sides of the heat sensitive tape may be coated or contain an adhesive surface for ease of installation on walls, ceilings, corners, spheres, etc.

Moreover, it is possible to provide an essentially continuous heat sensitive tape, i.e., the tape can be produced in lengths of thousands of feet, at a fraction of the cost of making conventional types or constructions of heat sensitive devices or cables.

With the present invention, the heat sensitive tape provides a thermocouple temperature monitoring device which consists of an elongated flexible strip of electrically non-conductive material carrying two dissimilar thermoelectric conductors disposed in an electrical insulation having a high negative temperature coefficient. The tape is passive and self-generating to generate a voltage potential between the thermoelectric conductors which is indicative of the temperature existing along its entire length, or if the temperatures are unequal, at the hottest point along the tape length when subjected to external temperatures. When monitored by a high input impedance temperature device, the heat sensitive tape is capable of (1) precise, non-perishable, reproducible measurement of the temperature and (2) identification of the location of the hottest spot, and is capable of utilizing varying combinations of materials to yield various mechanical properties and temperature-voltage response curves.

Various changes coming within the spirit of the present invention may suggest themselves to those skilled in the art. Hence, it will be understood that the invention is not to be limited to the specific embodiments shown and described or the uses mentioned. On the contrary, the specific embodiments and uses are intended to be merely exemplary with the present invention being limited only by the true spirit and scope of the appended claims.

I claim:

1. A heat sensitive tape operable in a predictable fashion over a range of temperatures for generating a measurable voltage indicative of the temperature along said tape to provide a continuous temperature sensor, comprising:
   an elongated flexible strip of electrically non-conductive material;
   a pair of thermoelectric conductors extending along said strip in spaced apart side-by-side relation, said conductors being formed of thermoelectrically dissimilar materials; and
   means for passively self-generating a continuous temperature representative measurable voltage between said conductors when said tape is exposed to ambient temperature without the use of an external power source, said continuous temperature representative measurable voltage being adapted for conversion into ambient temperature measured in degrees, said passive self-generating means comprising a material having a negative temperature coefficient in contact with both of said conductors substantially along their entire length;
   said passive self-generating means causing an increase or decrease in said continuous temperature representative measurable voltage responsive to an associated increase or decrease in ambient temperature at every location along said tape, the change in said voltage under such condition being measurable and representative of an increase or decrease in ambient temperature and adapted for conversion into a new ambient temperature along said cable measured in degrees, said passive self-generating means also causing a change in said continuous temperature representative measurable voltage responsive to an associated increase in temperature above the prevailing ambient at any location along said tape, the change in said voltage under such condition also being measurable and representative of an increase in localized temperature and adapted for conversion into a maximum temperature along said tape measured in degrees;
   whereby said heat sensitive tape may be utilized not only to monitor ambient temperature but also to monitor for any localized increase in temperature over said range of temperatures for said tape in a predictable fashion to provide a continuous temperature sensor.

2. The heat sensitive tape as defined by claim 1 wherein said material comprising said passive self-generating means is an electrical insulation disposed on at least a portion of the surface of the said strip.

3. The heat sensitive tape as defined by claim 2 wherein said surface portion of said strip is provided by applying a manganese nitrate solution over and between said conductors.

4. The heat sensitive cable as defined by claim 3 wherein said manganese nitrate solution is provided by heating manganese nitrate at a temperature of approximately 100° F. until melted and thereafter heating said melted manganese nitrate at between approximately 400° to 500° F. for approximately 3 minutes.

5. The heat sensitive cable as defined by claim 4 wherein said surface portion of said strip is provided by heating said strip after applying said manganese nitrate solution over and between said conductors.

6. The heat sensitive tape as defined by claim 5 wherein said electrical insulation comprises a solution of approximately 61 percent manganese nitrate and said strip is heated to a temperature of between 300° and 450° F.

7. The heat sensitive tape as defined by claim 2 wherein said surface portion of said strip has a bonding material thereon prior to applying said insulation.

8. The heat sensitive tape as defined by claim 7 wherein said surface portion of said strip is provided by impregnating said bonding material with heat treated manganese dioxide.

9. The heat sensitive tape as defined by claim 2 wherein at least the center portion of at least one surface of said strip has a bonding material thereon, said electrical insulation on said surface portion of said strip being provided by impregnating said bonding material with heat treated manganese dioxide.

10. The heat sensitive tape as defined by claim 9 including a second elongated flexible strip of electrically non-conductive material overlying said conductors and said insulation, said second flexible strip being secured to said first flexible strip to retain said conductors in spaced apart side-by-side relation in contact with said insulation.

11. The heat sensitive tape as defined by claim 10 wherein said second flexible strip has a bonding material on at least the surface confronting said first flexible strip, said second flexible strip being secured by said bonding material to said first flexible strip.

12. The heat sensitive tape as defined by claim 2 wherein at least one surface of said strip has a bonding material thereon, said electrical insulation on said surface portion of said strip being provided by impregnating the center portion of said bonding material with heat treated manganese dioxide.

13. The heat sensitive tape as defined by claim 12 including a second elongated flexible strip of electrically non-conductive material overlying said conductors and said insulation, said second flexible strip being secured by said bonding material to said first flexible strip to retain said conductors in spaced apart side-by-side relation in contact with said insulation.

14. The heat sensitive tape as defined by claim 13 wherein at least one of said first and second flexible strips has a bonding material on the surface facing away from the other of said strips, whereby said heat sensitive tape may be secured by said bonding material to a surface to monitor temperature.

15. The heat sensitive tape as defined by claim 1 wherein one of said conductors is formed of a nickel/chromium alloy and the other of said conductors is formed of a copper/nickel alloy.

16. The heat sensitive tape as defined by claim 15 wherein said nickel/chromium alloy comprises approximately 90 percent nickel and 10 percent chromium and said copper/nickel alloy comprises approximately 55 percent copper and 45 percent nickel.

17. The heat sensitive tape as defined by claim 1 wherein the heat sensitive tape is operable in a predictable fashion over a range of temperatures of between around at least −20° F. and 500° F.

18. A method of manufacturing a heat sensitive tape operable in a predictable fashion over a range of temperatures for generating a measurable voltage indicative of the temperature along said tape to provide a continuous temperature sensor, comprising:
providing an elongated flexible strip of electrically non-conductive material;
providing a pair of thermoelectric conductors adapted to be disposed along said strip in a spaced-apart side-by-side relation, said conductors being formed of thermoelectrically dissimilar materials;
providing means for passively self-generating a continuous temperature representative measurable voltage between said conductors on said strip when said tape is exposed to ambient temperature without the use of an external power source, said continuous temperature representative measurable voltage being adapted for conversion into ambient temperature measured in degrees, said passive self-generating means comprising a material having a negative temperature coefficient in contact with both of said conductors on said strip substantially along their entire length; and
positioning said pair of thermoelectric conductors so as to extend along said strip in spaced apart relation in contact with said passive self-generating means;
said passive self-generating means causing an increase or decrease in said continuous temperature representative measurable voltage responsive to an associated increase or decrease in ambient temperature at every location along said tape, the change in said voltage under such condition being measurable and representative of an increase or decrease in ambient temperature and adapted for conversion into a new ambient temperature along said cable measured in degrees, said passive self-generating means also causing a change in said continuous temperature representative measurable voltage responsive to an associated increase in temperature above the prevailing ambient at any location along said tape, the change in aid voltage under such condition also being measurable and representative of an increase in localized temperature and adapted for conversion into a maximum temperature along said tape measured in degrees;
whereby said manufacturing method provides a heat sensitive tape which may be utilized not only to monitor ambient temperature but also to monitor for any localized increase above ambient temperature over said range of temperatures for said tape in a predictable fashion to provide a continuous temperature sensor.

19. The metnod of manufacturing a heat sensitive tape as defined by claim 10 wherein said step of providing said material comprising said passive self-generating means includes disposing an electrical insulation on at least a portion of one surface of said strip.

20. The method of manufacturing a heat sensitive tape as defined by claim 19 wherein said disposing step includes applying a manganese nitrate solution.

21. The method of manufacturing a heat sensitive tape as defined by claim 20 wherein said manganese nitrate solution is provided by heating manganese nitrate at a temperature of approximately 100° F. until melted and thereafter heating said melted manganese nitrate at between approximately 400° to 500° F. for approximately 3 minutes.

22. The method of manufacturing a heat sensitive tape as defined by claim 21 wherein said disposing step includes heating said strip after applying said manganese nitrate solution.

23. The method of manufacturing a heat sensitive tape as defined by claim 22 wherein said surface portion of said strip is coated with a solution of approximately 61 percent manganese nitrate and said strip is heated to a temperature of between 300° and 450° F.

24. The method of manufacturing a heat sensitive tape as defined by claim 18 wherein at least a portion of one surface of said strip is covered with a bonding material, said covered surface portion thereafter being impregnated with heat treated manganese dioxide.

25. The method of manufacturing a heat sensitive tape as defined by claim 18 wherein one of said conductors is formed of a nickel/chromium alloy and the other of said conductors is formed of a copper/nickel alloy.

26. The method of manufacturing a heat sensitive tape as defined by claim 18 including the step of providing a second elongated flexible strip of electrically non-conductive material, and adhesively securing said second flexible strip to said first flexible strip to retain said conductors in spaced-apart side-by-side relation in contact with said passive self-generating means.

27. The method of manufacturing a heat sensitive tape as defined by claim 26 including the step of providing at least one of said first and second flexible strips with a bonding material on the surface facing away from the other of said strips, whereby said manufacturing method provides a heat sensitive tape which may be adhesively secured to a surface to monitor temperature.

28. The method of manufacturing a heat sensitive tape as defined by claim 18 wherein said passive self-generating means is heat treated manganese dioxide.

29. The method of manufacturing a heat sensitive tape as defined by claim 18 wherein the heat sensitive tape is operable in a predictable fashion over a range of temperatures of between around at least −20° F. and 500° F.

30. The heat sensitive tape of claim 1 wherein
one of said conductors being larger than the other of said conductors; and
means for generating a temperature representative measurable voltage between said conductors.

31. The heat sensitive tape as defined by claim 30 wherein the larger of said conductors is the positive conductor and the smaller of said conductors is the negative conductor.

* * * * *